United States Patent

Marovich et al.

[15] 3,655,546
[45] Apr. 11, 1972

[54] ELECTROCHEMICAL CELL

[72] Inventors: Frank A. Marovich, Hacienda Heights; Ray I. Wilson, La Habra, both of Calif.

[73] Assignee: Beckman Instruments, Inc.

[22] Filed: Apr. 22, 1969

[21] Appl. No.: 818,214

[52] U.S. Cl. ..........................................204/195
[51] Int. Cl. ......................................G01n 27/46
[58] Field of Search ...........................204/1 T, 195

[56] References Cited

UNITED STATES PATENTS

| | | | |
|---|---|---|---|
| 3,071,530 | 1/1963 | Neville | 204/195 |
| 3,278,408 | 10/1966 | Leonard et al | 204/195 |
| 3,410,778 | 11/1968 | Krasberg | 204/195 |
| 3,503,861 | 3/1970 | Volpe | 204/195 |
| 3,509,034 | 4/1970 | Paine | 204/195 |

*Primary Examiner*—T. Tung
*Attorney*—Thomas L. Peterson and Robert J. Steinmeyer

[57] ABSTRACT

An electrochemical cell for determining a constituent in a sample in which a pair of electrodes are joined by an electrolyte and separated from the sample by a selectively permeable membrane. A perforated plate overlying the membrane adjacent to the sensing electrode of the cell is spring biased toward said electrode. As a consequence, when the cell is subjected to a vacuum environment, the spring biased perforated plate will prevent alterations in the thickness of the electrolyte film space between the membrane and sensing electrode or bursting of the membrane due to the relatively higher pressure within the cell. The cell is stable in a vacuum environment and has fast response when utilized at low sample gas pressure.

5 Claims, 4 Drawing Figures

PATENTED APR 11 1972
3,655,546
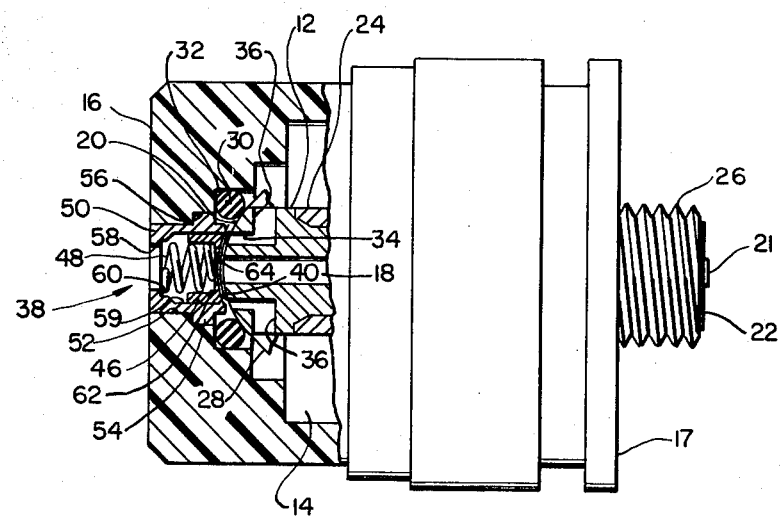
FIG. 1
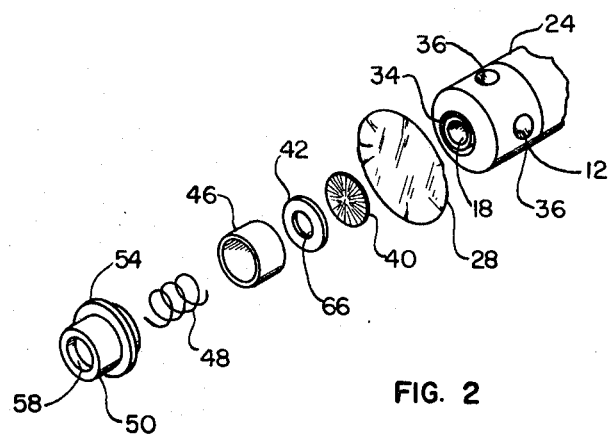
FIG. 2
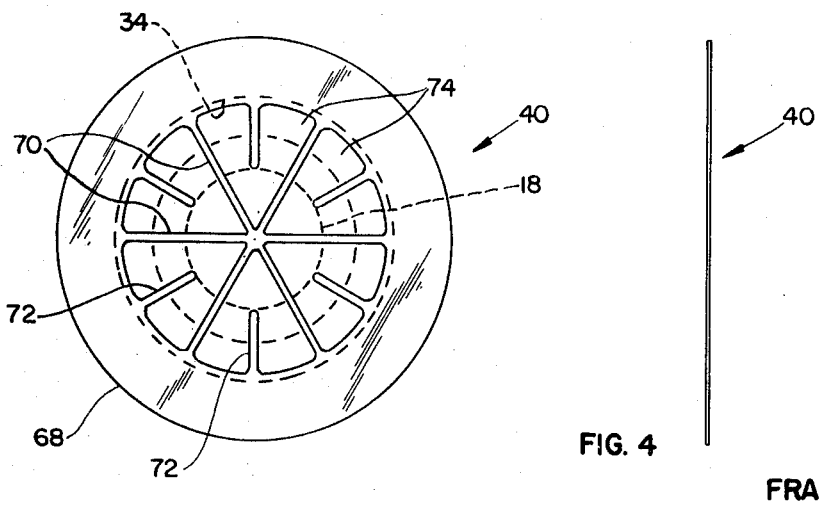
FIG. 3
FIG. 4
INVENTORS
FRANK A. MAROVICH
RAY I. WILSON
BY *Thomas L. Peterson*
ATTORNEY

3,655,546

PROCESS OF PREPARING LIQUID SINTERED COBALT-RARE EARTH INTERMETALLIC PRODUCT

The invention described herein may be manufactured and used by or for the United States Government for governmental purposes without payment of any royalty thereon.

BACKGROUND OF THE INVENTION

1. Field of the Invention

This invention relates generally to an electrochemical cell for determining a constituent in a sample and, more particularly, to means for providing pressure compensation for such a cell.

2. Description of the Prior Art

Electrochemical cells of the type to which this invention pertains generally comprise a pair of electrodes joined by an electrolyte and separated from the sample medium to be analyzed by means of a membrane that is permeable to the constituent in the sample being determined but is impermeable to the electrolyte. A cell of this type utilized for polarographic analysis to determine the partial vapor pressure of a particular gas in a liquid or gaseous medium is described in U.S. Pat. No. 2,913,386. In a cell of this type, a suitable polarizing voltage is applied across the electrodes so that in the absence of the constituent in the sample that is being measured, the cell becomes polarized so that the current which normally flows between the electrodes and the external current measuring circuit is reduced nearly to zero after a short period of time. In the presence of the constituent in the sample that is to be measured, however, the electrodes become depolarized and current flows again. The magnitude of the current between the electrodes is a function of the rate or speed at which the constituent being analyzed passes through the membrane and of the diffusion process that takes place in the immediate vicinity of the sensing electrode of the cell adjacent to the membrane. As the constituent to be determined has to pass through the membrane and diffuse through a thin film of electrolyte disposed between the membrane and the sensing electrode, the spacial relationship between the membrane and the electrode which defines the thickness of the electrolyte film space is extremely important.

Although polarographic cells of the above type have given accurate performance for many practical situations, it has been found that occasionally a shift in calibration of the reading of the cells and in the response of the output of the cells results from changes in the pressure of the medium being tested, causing a change in the spacial relationship between the sensing electrode and the membrane. It has been the conventional practice in order to overcome such effects to provide a passage in the cell communicating between the electrolyte reservoir and the test medium so that there is provided equal pressure on opposite sides of the membrane adjacent to the sensing electrode. This form of pressure compensation is generally satisfactory except for the fact that the passage in the cell wall permits leakage of electrolyte from the cell or evaporation of the electrolyte within the cell. Also, the open passage sometimes permits contamination of the electrolyte in the cell if the sample being analyzed is a liquid which may permeate through the passage into the electrolyte. Thus, if it is desired that the cell be sealed so that the electrolyte in the cell will not evaporate or become contaminated, the provision of an open pressure compensation passage as has been provided in the past is unacceptable and some other form of pressure compensating system is required. One situation where there is a necessity for such a system is when it is desired to employ a sealed cell in a vacuum environment. In such an environment the pressure differential across the membrane of the cell causes the membrane to move away from the sensing electrode, thus altering the thickness of the electrolyte film space between the membrane and sensing electrode. Also, on some occasions the membrane will burst if the cell is rapidly moved from a normal atmospheric condition into a vacuum environment. The present invention is directed to overcoming these difficulties.

SUMMARY OF THE INVENTION

It is the principal object of the present invention to provide an improved pressure compensation means for an electrochemical cell of the type discussed above.

According to the principal aspect of the present invention, there is provided in an electrochemical cell of the type discussed above a perforated plate which overlies the membrane adjacent to the sensing electrode and means for biasing the plate, and hence the membrane, toward the sensing electrode. The biased perforated plate serves to withstand internal cell pressure when the cell is exposed to a vacuum environment so that the membrane will not move away from the sensing electrode and alter the electrolyte film space therebetween. Thus, this arrangement assures the maintenance of a substantially constant spacial relationship between the membrane and sensing electrode and, hence, the thickness of the electrolyte film space is unaltered when the exterior of the cell is exposed to various vacuum conditions. As a consequence, the gas diffusion processes occurring adjacent to the sensing electrode and the alternating current resistance of the cell remain virtually unchanged under changing vacuum conditions, thus minimizing instability in the electrical output and loss of response of the cell as encountered in previous cells employed for vacuum environmental measurements.

BRIEF DESCRIPTION OF THE DRAWING

FIG. 1 is a partial longitudinal sectional view of a preferred form of the cell of the present invention;

FIG. 2 is an exploded view of the various elements of the cell employed to apply a biasing force upon the membrane toward the sensing electrode of the cell;

FIG. 3 is an enlarged plan view of the perforated plate employed in the cell illustrated in FIGS. 1 and 2; and FIG. 4 is a side view of the plate illustrated in FIG. 3.

DESCRIPTION OF THE PREFERRED EMBODIMENTS

Referring now to FIG. 1 of the drawing in detail, there is illustrated an electrochemical cell constructed in accordance with the present invention, generally designated by numeral 10. This cell includes a generally cylindrical body 12 mounted coaxially within a cylindrical recess 14 provided in a housing 16. The rear of the body 12 extends beyond the rear surface 17 of the housing. The body and housing are both formed of nonconductive material such as plastic. A sensing electrode 18 is mounted longitudinally within the central body 12 and terminates at its forward end flush with the rounded forward end 20 of the body. The rear end 21 of the electrode extends slightly beyond the rear 22 of the body. A second electrode 24 generally in the form of a cylinder is imbedded in the outer wall of the body 12 except for its outer surface. The rear portion 26 of electrode 24 extends beyond the rear surface 17 of the housing. This rear portion 26 is externally threaded so that when said portion is threaded into a suitable receptacle, not shown, having coaxially positioned contacts therein, the electrode 24 will be in electrical contact with the outer contact of the receptacle while the end 21 of sensing electrode 18 will be in contact with the central contact of the receptacle. The contacts of the receptacle will be connected through appropriate conductors, not shown, which will connect the cell 10 to a suitable external circuit.

Overlying the forward end 20 of the central body 12 and the sensing electrode 18 is a membrane 28 which is permeable to the constituent being measured and relatively impermeable to electrolyte. A preferred material for this membrane is a polytetrafluoroalkane, such as Teflon; however, materials such as polyethylene and polypropylene may be utilized. The membrane is held tightly over the forward end 20 of the body 12 by means of a rubber O-ring 30 mounted in a recess 32 adjacent to the forward end of the housing 16. As a consequence, there is provided between the membrane and forward end of the body 12 and sensing electrode 18 an electrolyte film space. This space is in communication with the recess 14 by means of an annular passage 34 which extends from the forward end of the body 12 rearwardly a short distance, and via a plurality of radially extending passages 36 which open into the recess 14. While four equally spaced passages 36 are shown in the drawing, it is of course understood that fewer or a greater number of such passages could be provided if desired.

When the cell 10 is used for the polarographic measurement of oxygen, for example, the sensing electrode 18 may be formed of gold or other noble metal, and the second electrode may be formed of silver. The recess 14 in the housing 16 is filled with a suitable electrolyte such as potassium chloride, which may be provided in the form of a solution or gel. This electrolyte is also provided in the film space between the membrane 28 and the sensing electrode 18 and is continuously renewed by means of the fluid communication between the film space and recess 14 provided by the passages 34 and 36. As well known in the art, a suitable polarizing potential is impressed across the electrodes from an external circuit, not shown, so that when oxygen diffuses through the membrane 28 into the electrolyte film space adjacent to the electrode 18, the oxygen is reduced at the electrode thereby producing a current which is an indication of the partial pressure of oxygen in the sample medium being analyzed. Also, as is well known in the art, the external voltage source may be eliminated if the electrodes are formed of materials which produce an electrical voltage potential therebetween of proper magnitude. For example, the sensing electrode 18 may be formed of gold, silver or other noble metal and the second electrode 24 of zinc, cadmium or lead and the electrolyte may be a potassium hydroxide solution or gel.

In accordance with the present invention, there is provided a spring assembly 38 that provides pressure compensation for the cell when the cell is exposed to a vacuum environment. That is to say, the assembly 38 is designed to withstand internal pressures within the cell and thus prevent the membrane 28 from moving away from the sensing electrode which would cause a change in the thickness of the electrolyte film space.

As best seen in FIG. 2, the spring assembly 38 includes, commencing from the membrane 28 and moving forwardly, a perforated plate or grid 40, grid washer 42, grid support 46, coil spring 48, and spring retainer 50. The spring retainer 50 has a generally cylindrical configuration and is mounted in a central cylindrical bore 52 in the forward end of the housing. This bore is coaxial with the sensing electrode 18. The rear portion of the retainer 50 is provided with an outwardly extending annular flange 54 which is received in an annular recess 56 in the housing. As can be appreciated, by the positioning of the flange 54 in the recess 56, the spring retainer 50 is prevented from forward movement with respect to the housing 16.

Communicating cylindrical openings 58 and 59 coaxial with the sensing electrode 18 are provided in the forward and rear portions, respectively of the spring retainer 50. As can be seen in FIG. 1, the opening 58 has a diameter less than that of opening 59, providing therebetween a rearwardly facing shoulder 60. The grid support 46 is generally cup-shaped and is slidably received in the opening 59 in the spring retainer. The spring 48 is positioned coaxially in the support 46 and retainer 50 so that the forward end of the spring bears against shoulder 60 while the rear of the spring bears against the inner wall of the base 62 of the grid support. A central opening 64 in the base 62 is coaxial with the openings 58 and 59 in the spring retainer and the sensing electrode 18, and preferably has a diameter slightly greater than that of the sensing electrode. The grid washer 42 is also provided with a central opening 66 coaxial with the sensing electrode and of a diameter slightly greater than that of the sensing electrode. As can be appreciated, the spring 48 urges the grid support 46 toward the washer 42, and hence the grid 40 against the outer surface of the membrane 28.

The grid 40 can best be seen in FIGS. 3 and 4. It comprises a circular plate which is coaxial with the electrode 18. The plate is preferably formed of a relatively thin metal which is slightly flexible so that it will conform to the rounded forward end 20 of body 12 when urged thereagainst by the spring 48. Preferably the rear of the base 62 of grid support 46 that bears against the washer 42, and the washer itself, have a generally dished or concave configuration so as to also conform to the rounded forward surface of the body 12.

The grid includes an outer ring portion 68 and a plurality of radially inwardly extending spokes. Alternate ones of the spokes 70 meet at the center of the ring 68 while the other spokes 72 terminate short of the center of the ring at a point which is coincident with the outer perimeter of the sensing electrode 18, which is illustrated in phantom lines in FIG. 3. By this arrangement, there is a relatively large open space provided in that portion of the grid 40 that overlies the membrane in the area of the sensing electrode. Also, the spaced spokes 70 and 72 define therebetween radially extending perforations or apertures 74 the outer limits of which are generally coaxial with the outer perimeter of the annular electrolyte passage 34 in the central body 12 of the cell, such annular passage being shown in phantom lines in FIG. 3. As a consequence, the apertures 74 in the grid extend from a point coincident with the annular passage 34 in body 12 toward the center of the grid. Thus, there is ensured that radial paths are provided for electrolyte to migrate from the recess 14 via passages 36 and 34 and through the electrolyte film space between the membrane 28 and sensing electrode to the sensing electrode itself, even though under some conditions the spring biased grid may firmly press portions of the membrane against the end 20 of body 12. Without such radial paths in the grid, it would be possible that urging of a perforated plate of different configuration, such as a screen, against the outside of the membrane might result in the electrolyte in the film space between the membrane and sensing electrode being squeezed out thus breaking electrolytic connection between the two electrodes in the cell.

In order to ensure that a constant film space is provided between the membrane and sensing electrode, it is desirable that the spring 48 be formed of an alloy which has a constant modulus of elasticity over the temperature range which will be encountered by the cell and that the spring be designed to have a low spring constant which applies a specific constant force to the grid. Preferably the force of the spring is calculated to resist an internal pressure within the cell of one atmosphere when the exterior of the cell is exposed to a vacuum environment. Also, the force of the spring should be distributed at a low enough stress level to avoid exceeding the creep stress level for the required operating and storage temperatures of the materials from which the housing 16, body 12 and membrane 28 are made. The advantage of the low spring constant of the spring is that changes in the relative lengths or other dimensions of the parts of the cell will be absorbed by the spring and will not change the applied force enough to effect the electrolyte film space thickness.

The spacing between the spokes 70 and 72 of the grid 40 is calculated to provide together with the force of the spring 48 sufficient support or resistance to the plastic membrane 28 so that over the range of pressure and temperature fluctuations which will be encountered in the samples being analyzed by the cell 10, particularly when the cell is moved from an atmospheric condition to a vacuum environment, the membrane will not shift outwardly to cause alterations in the thickness of the electrolyte film space. As a consequence, cells constructed in accordance with the teachings of the present invention have highly stable electrical outputs and virtually no loss in their electrical response when subjected to vacuum environments.

While the present invention has been described as being particularly applicable to polarographic sensors, due to the importance of maintaining a constant electrolyte film space in the diffusion limited process of polarography, the invention is also applicable to other types of electrochemical sensors employing a pair of electrodes joined by an electrolyte and separated from the sample by a selectively permeable membrane. For example, the invention could be applied to a carbon dioxide sensor employing as the sensing electrode an ion sensitive glass electrode and an electrochemical reference electrode as the second electrode. In this type of cell, the potential difference between the two electrodes is determined as a function of the change in hydrogen ion concentration of the electrolyte in the film space resulting from $CO_2$ diffusing through the membrane into the electrolyte. Although this potentiometric analysis is not a diffusion limited process, the thickness of the electrolyte film over the glass electrode does have a bearing on the response of the electrode and thus the application of the present invention to such an arrangement would be advantageous.

Although we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent structures and devices.

What is claimed is:

1. An electrochemical cell for determining a constituent in a sample comprising a pair of electrodes adapted to be joined by an electrolyte, one of said electrodes being a sensing electrode, a membrane permeable to the constituent and impermeable to the electrolyte arranged to separate said electrodes and electrolyte from the sample being analyzed, and said membrane overlying said sensing electrode to define an electrolyte film space therebetween wherein the improvement comprises:

a perforated plate overlying said membrane adjacent to said sensing electrode, said plate comprising a ring provided with a plurality of spaced radially inwardly extending spokes; and means biasing said plate toward the sensing electrode.

2. A cell as set forth in claim 1 wherein said spokes and the force applied thereto by said biasing means provide sufficient external support for said membrane to withstand about one atmosphere internal cell pressure when the exterior of the cell is exposed to a vacuum environment.

3. A cell as set forth in claim 1 wherein some of said radially inwardly extending spokes terminate short of the center of said ring, and said center overlies said sensing electrode.

4. An electrochemical cell for determining a constituent in a sample comprising a pair of electrodes adapted to be joined by an electrolyte, one of said electrodes being a sensing electrode, a membrane permeable to the constituent and impermeable to the electrolyte arranged to separate said electrodes and electrolyte from the sample being analyzed, and said membrane overlying said sensing electrode to define an electrolyte film space therebetween wherein the improvement comprises:

a circular perforated plate overlying said membrane adjacent to said sensing electrode, said plate being formed with a plurality of radially extending perforations with the center of said plate approximately overlying the center of said sensing electrode; and means biasing said plate toward said sensing electrode.

5. A cell as set forth in claim 4 wherein said cell includes a nonconductive body positioned in an electrolyte reservoir, said sensing electrode being mounted in said body and terminating at one end thereof, said membrane and plate overlying said one end of said body, a passage in said body extending from the side thereof in communication with said reservoir to said one end of the body and within the outer limits of said radially extending perforations.

* * * * *